(12) United States Patent
Fujii et al.

(10) Patent No.: US 7,830,062 B2
(45) Date of Patent: Nov. 9, 2010

(54) MOTOR HAVING ROUND AND ANGULAR COILS

(75) Inventors: Yoshio Fujii, Kyoto (JP); Yosuke Yamada, Kyoto (JP); Hideaki Suzuki, Kyoto (JP)

(73) Assignee: Nidec Corporation, Kyoto (JP)

( * ) Notice: Subject to any disclaimer, the term of this patent is extended or adjusted under 35 U.S.C. 154(b) by 295 days.

(21) Appl. No.: 11/954,435

(22) Filed: Dec. 12, 2007

(65) Prior Publication Data

US 2008/0136284 A1 Jun. 12, 2008

(30) Foreign Application Priority Data

Dec. 12, 2006 (JP) .............................. 2006-334199
Dec. 12, 2006 (JP) .............................. 2006-334202

(51) Int. Cl.
*H02K 1/16* (2006.01)
*H02K 3/04* (2006.01)
*H02K 3/12* (2006.01)

(52) U.S. Cl. ................. 310/201; 310/180; 310/216.069

(58) Field of Classification Search .......... 310/216.069, 310/216.071–216.073, 214, 179, 180, 201
See application file for complete search history.

(56) References Cited

U.S. PATENT DOCUMENTS

| | | | | |
|---|---|---|---|---|
| 1,742,190 A * | 1/1930 | Apple | .......................... | 29/598 |
| 1,822,261 A * | 9/1931 | Apple | .......................... | 310/201 |
| 6,229,241 B1 | 5/2001 | Ishigami et al. | | |
| 6,664,695 B2 * | 12/2003 | Asao et al. | ................... | 310/208 |
| 6,787,961 B2 * | 9/2004 | Neet et al. | ................... | 310/201 |
| 7,612,480 B2 * | 11/2009 | Fujii et al. | ............. | 310/156.53 |
| 7,646,127 B2 * | 1/2010 | Fujii et al. | ................... | 310/179 |
| 2003/0164248 A1 * | 9/2003 | Kulig et al. | .......... | 174/DIG. 32 |
| 2007/0278889 A1 * | 12/2007 | Sasaki et al. | ................. | 310/184 |
| 2008/0136274 A1 * | 6/2008 | Fujii et al. | ..................... | 310/71 |
| 2008/0136281 A1 * | 6/2008 | Fujii et al. | ............. | 310/156.08 |
| 2008/0136283 A1 * | 6/2008 | Fujii et al. | ................... | 310/184 |
| 2008/0136284 A1 * | 6/2008 | Fujii et al. | ................... | 310/214 |
| 2008/0303370 A1 * | 12/2008 | Rahman et al. | ............. | 310/179 |

FOREIGN PATENT DOCUMENTS

| | | | |
|---|---|---|---|
| DE | 34 33 450 | * | 3/1986 |
| JP | 03-155358 A | | 7/1991 |
| JP | 04-244752 A | | 9/1992 |
| JP | 08-205441 A | | 8/1996 |
| JP | 2004-159460 A | | 6/2004 |

* cited by examiner

*Primary Examiner*—Karl I Tamai
(74) *Attorney, Agent, or Firm*—Keating & Bennett, LLP

(57) ABSTRACT

A straight line portion of a substantially U-shaped angular wire having a substantially rectangular cross section and a straight line portion of a substantially U-shaped round wire having a substantially circular cross section are accommodated at a slot arranged at a stator of a motor. The round wire is arranged at a more radially inward portion of the slot than the angular wire is. The connecting portion of the round wire is arranged radially inwardly of the straight line portion thereof. The connecting portion of the angular wire is arranged radially outwardly of the straight line portion thereof.

8 Claims, 12 Drawing Sheets

MOTOR HAVING ROUND AND ANGULAR COILS

BACKGROUND OF THE INVENTION

1. Field of the Invention

The present invention relates to a manufacturing method of a motor and an armature of the motor.

2. Description of the Related Art

In recent years, various components and mechanisms used in a motor vehicle have been developed with a specific focus on environmental concerns (e.g., energy efficiency, reduction of carbon dioxide emission, and the like). One of such mechanisms is an "idling stop" mechanism which allows an engine of the vehicle not in motion to stop automatically in order to reduce the carbon dioxide emission.

However, when a compressor is activated by the engine of such vehicle, each time the engine stops, the components activated by the compressor, such as an air conditioner, also stop. In order to prevent such inconvenience, the compressor of the components, such as an air conditioner, is operated by a motor (e.g., IPM (Interior Permanent Magnet)). That is, the compressor is activated by a car battery, which allows the air conditioner or the like to continue to operate even while the engine is not running.

Such a compressor is required to produce a large output while operating on a relatively low powered car battery. Therefore, the electric current conducted through coils in the motor, which is a power source for such compressor, is great which usually requires an angular wire (i.e., a wire having a rectangular shape in cross section) whose cross section is large.

Conventionally, the angular wire is U-shaped, inserted between teeth, and then connected at one end thereof to a busbar having terminals. Such configuration, however, increases the dimensions of the stator particularly in the axial direction.

Also conventionally, a technology has been available in which coils are formed separately from a stator core and inserted in between teeth. Such configuration, however, increases the dimension of the stator particularly in the axial direction. Also, such configuration may damage an insulating layer on the surface of the coils. Furthermore, such configuration requires additional equipment to insert the coils between the teeth, thus complicating the manufacturing process of the stator.

SUMMARY OF THE INVENTION

In order to overcome the problems described above, preferred embodiments of the present invention provide a motor having a stator which includes a stator core having a plurality of teeth each extending in a radial direction centered about a predetermined central axis, and arranged in a circumferential direction so as to be evenly spaced apart from one another, and a plurality of coils located in slots each defined by the teeth located next to one another, and a plurality of wires each including a portion extending in an axial direction and which are electrically connected to each other. The plurality of wires include an angular wire having a cross section that includes at a portion thereof corresponding to the slot, a substantially rectangular shape when viewed from one end of the axial direction and a round wire having a cross section that includes at a portion thereof corresponding to the slot, a substantially circular shape when viewed from the one end of the axial direction. By virtue of such configuration, a degree of design freedom for the coils will be improved while a circumferential width of each tooth remains uncompromised.

Also, the stator of the motor according to a preferred embodiment of the present invention further includes a plurality of coils disposed at a plurality of slots each defined by the teeth located next to one another, by electrically connecting a plurality of wires at an end portion thereof. The wires each include a pair of straight line portions, a connecting portion at one end portion of the straight line portions connecting the pair of straight line portions integrally, and the end portion at which the wires are electrically connected. Also, a distance between the wires at the corresponding portion is greater than a distance between the wires at the straight line portions.

Other features, elements, steps, characteristics and advantages of the present invention will become more apparent from the following detailed description of preferred embodiments thereof with reference to the attached drawings.

BRIEF DRAWING OF THE DRAWING

DETAILED DESCRIPTION OF PREFERRED EMBODIMENTS

Figure 1:
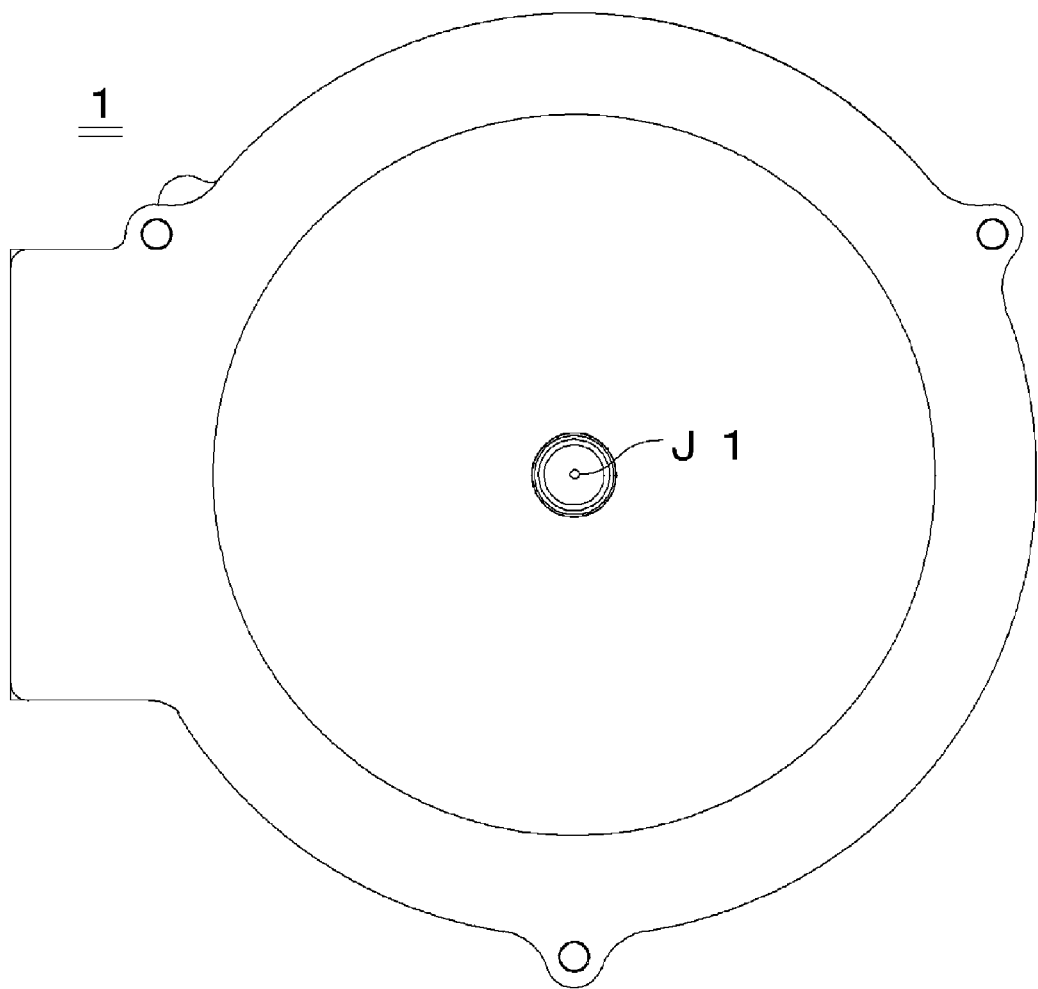
FIG. 1 is a schematic plan view of an exterior of a motor according to a first preferred embodiment of the present invention.

Note that in the description of preferred embodiments of the present invention herein, words such as upper, lower, left, right, upward, downward, top and bottom for describing positional relationships between respective members and directions merely indicate positional relationships and directions of the drawings. Such words do not indicate positional relationships and directions of the members mounted in an actual device. Also note that reference numerals, figure numbers and supplementary descriptions are shown below for assisting the reader in finding corresponding components in the description of the preferred embodiments below to facilitate the understanding of the present invention. It is understood that these expressions in no way restrict the scope of the present invention.

Figure 2:
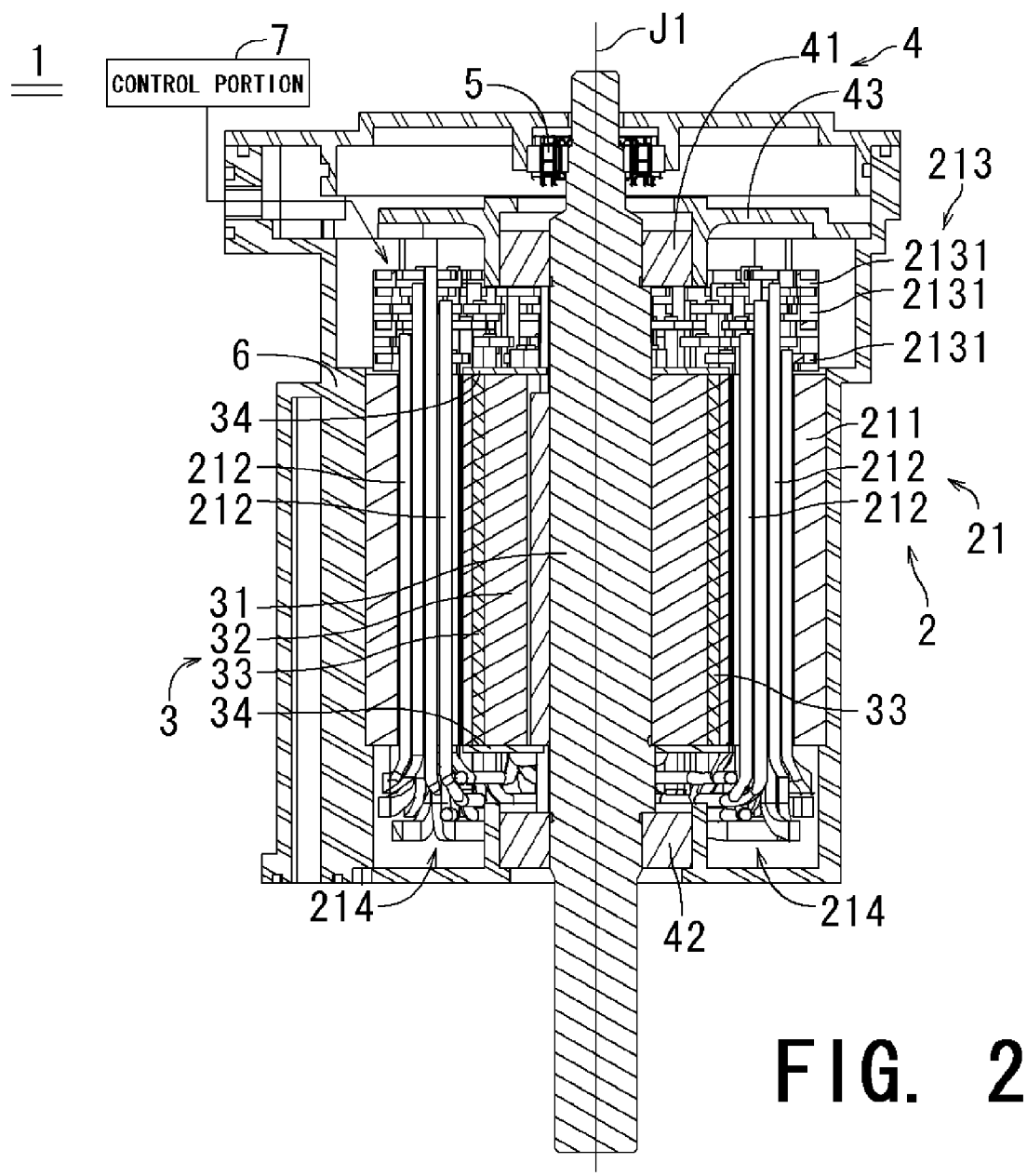
FIG. 2 is a schematic longitudinal sectional view in an axial direction of the motor shown in FIG. 1.

FIG. 1 is a schematic plan view of an exterior of a motor 1 according to a first preferred embodiment of the present invention. FIG. 2 is a schematic cross sectional view in an axial direction of the motor 1 shown in FIG. 1.

The motor 1 is a three phase motor which will be used as a compressor for an air conditioner, or the like, in a motor vehicle having an idling stop mechanism (that is, a mechanism for automatically stopping an engine of the vehicle when not in motion). As shown in FIGS. 1 and 2, the motor 1 is preferably configured such that the central axis J1 is approximately twice as long as a radial length.

As shown in FIG. 2, the motor 1 which is an inner rotor type motor preferably includes a stator portion 2 which is a fixed assembly, a rotor portion 3 which is a rotatable assembly, a bearing mechanism 4 which is arranged at the stator portion 2 and rotatably supports the rotor portion 3 with respect to the stator portion 2 in a concentric manner with the central axis J1, a resolver portion 5 which detects a rotational angle of the rotor portion 3 relative to the stator portion 2, and a housing 6 which accommodates therein the stator portion 2, the rotor portion 3, the bearing mechanism 4 and the resolver portion 5. The housing 6 preferably includes a cylindrical portion for retaining the stator 21 (described below), and a bottom portion for covering a lower side of the stator 21.

Figure 3:
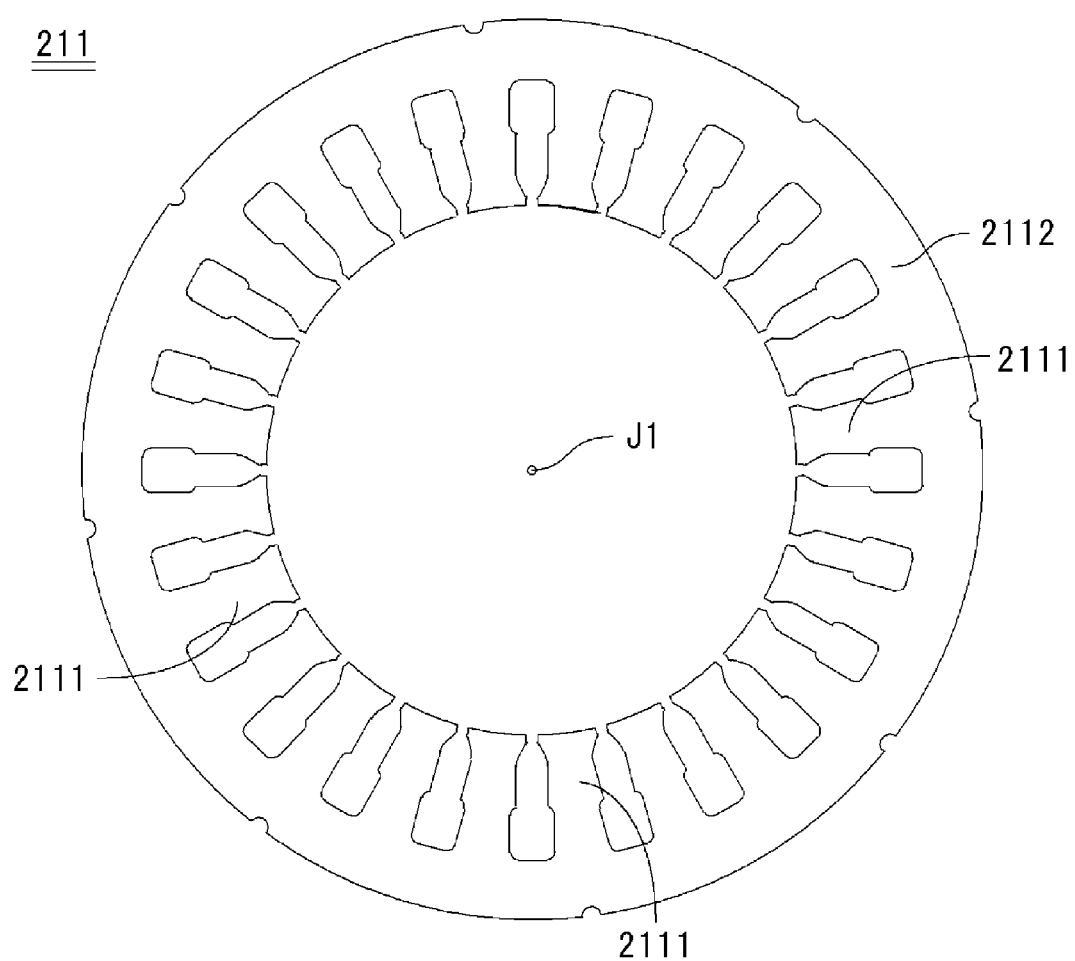
FIG. 3 is a schematic plan view of a stator core of a stator according to the first preferred embodiment of the present invention.

The stator portion 2 preferably includes the stator 21 arranged at an inner circumferential surface of the housing 6. The stator 21 preferably includes a stator core 211 which is formed by laminating a plurality of thin silicon steel plates on top of another. FIG. 3 is a schematic plan view of the stator core 211 according to the present preferred embodiment. As shown in FIG. 3, the stator core 211 preferably includes a plurality (for example, 24 in the present preferred embodiment) of teeth 2111 each extending outwardly in the radial direction, and a core back portion 2112 having a substantially annular shape arranged at an end portion of the teeth away from the central axis J1.

Figure 4:
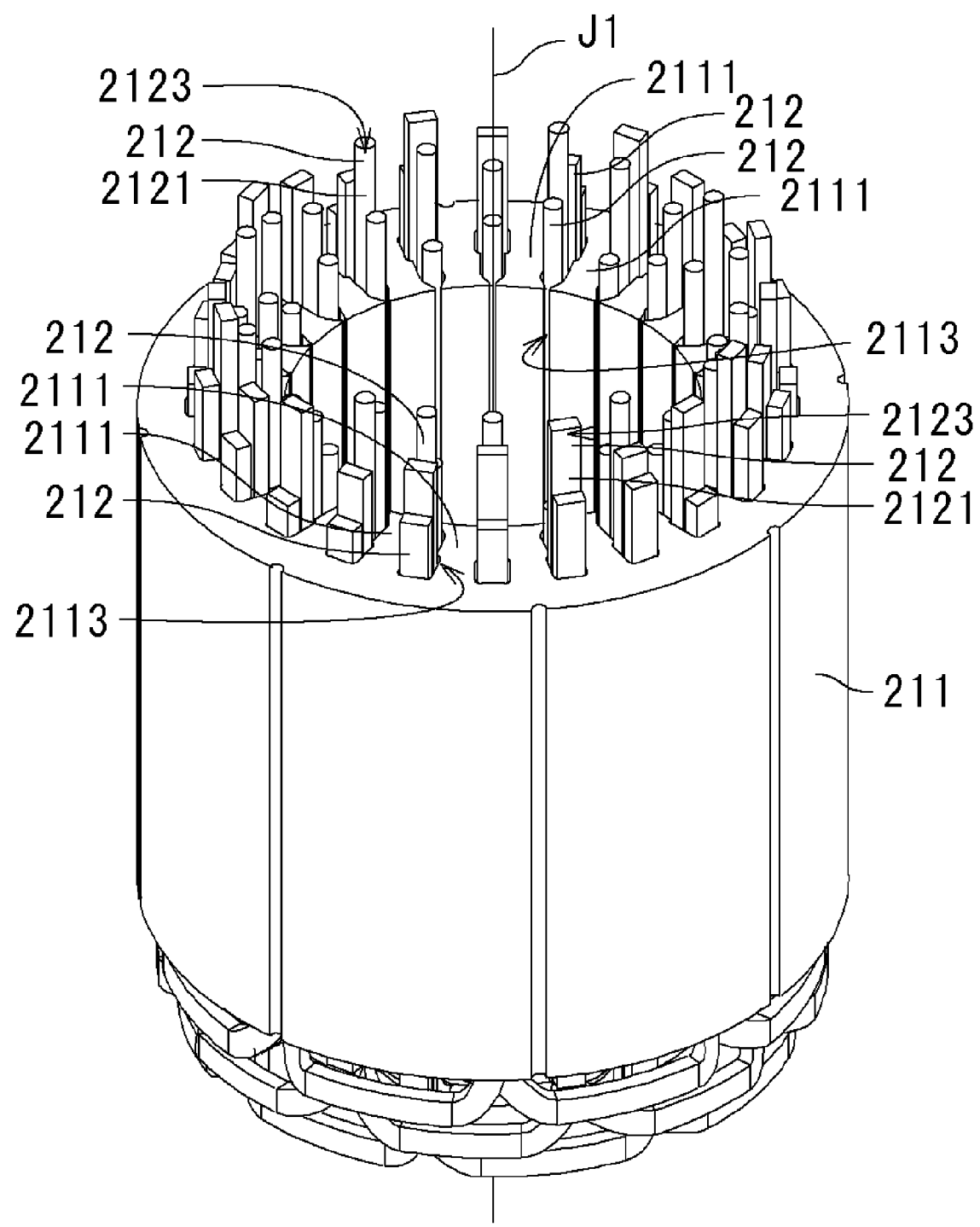
FIG. 4 is a schematic perspective view of a plurality of wires connected to the stator core of the stator according to the first preferred embodiment of the present invention.

FIG. 4 is a schematic perspective view of the stator core 211 and a plurality (for example, 48 in the present preferred embodiment) of wires 212 each attached to the stator core 211. As shown in FIG. 4, each wire 212 preferably includes a portion which extends in a parallel or substantially parallel manner with respect to the central axis J1 at a slot 2113 which is defined between each pair of adjacent teeth 2111 (i.e., in total, the stator core 211 preferably includes 24 of slots 2113, for example). The plurality of wires 212 include a plurality of angular wires 212a (shown in FIG. 5A), and a plurality of round wires 212b (shown in FIG. 5B). Note that in the description hereafter the angular wire 212a and the round wire 212b will be collectively referred to as the wire 212 unless the distinction therebetween is necessary.

Figure 5A:
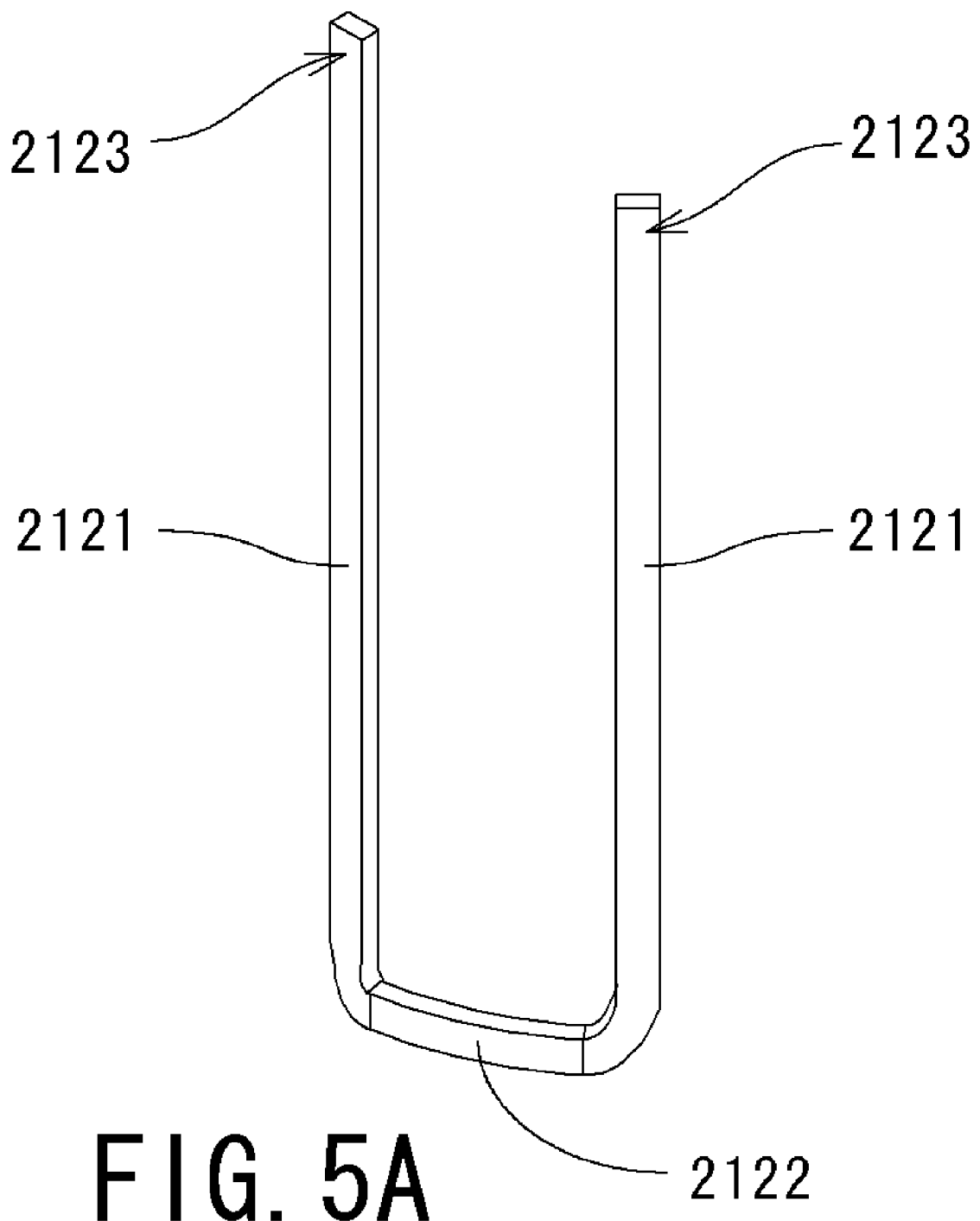
FIG. 5A is a schematic cross sectional view of an angular wire according to a preferred embodiment of the present invention.
Figure 5B:
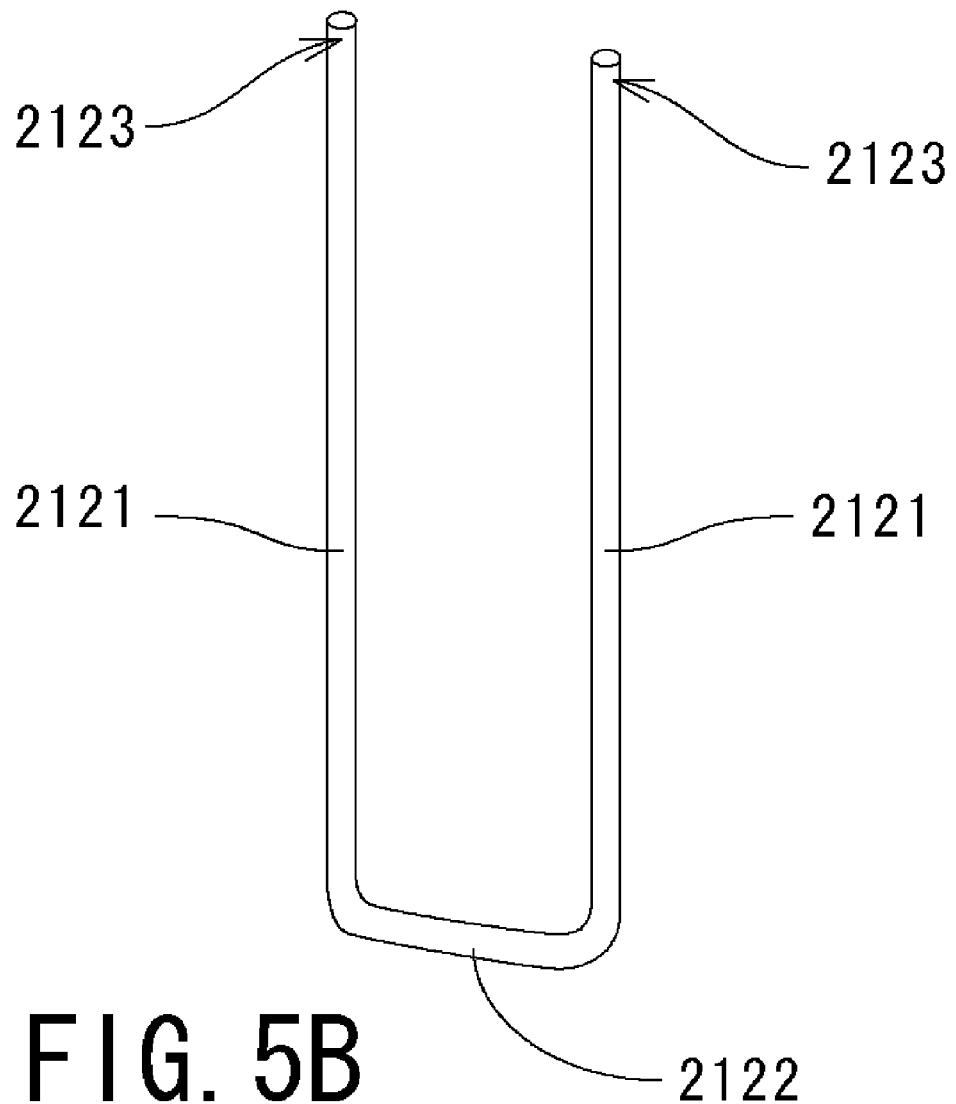
FIG. 5B is a schematic cross sectional view of a round wire according to a first preferred embodiment of the present invention.

As shown in FIG. 5A and FIG. 5B, the angular wire 212a and the round wire 212b both have an approximately U-shaped configuration. Note that in the present preferred embodiment, a diameter of a cross section of the round wire 212b is greater than approximately 3.16 mm and smaller than approximately 3.24 mm; and a cross section of the angular wire 212a is greater than approximately 12.3 mm².

The angular wire 212a and the round wire 212b are accommodated in corresponding slots 2113 (see FIG. 4). As shown in FIGS. 5A and 5B, the angular wire 212a and the round wire 212b each include a pair of straight line portions 2121 extending in the direction parallel or substantially parallel to the central axis J1, and a connecting portion 2122 which connects continuously and integrally the pair of the straight line portions 2121 together at an axially portion thereof so as to form the approximately U-shaped configuration. As shown in FIG. 4, the wires 212 each include a pair of the end portions 2123 which protrude in an upward direction from the slot 2113.

Figure 6A:
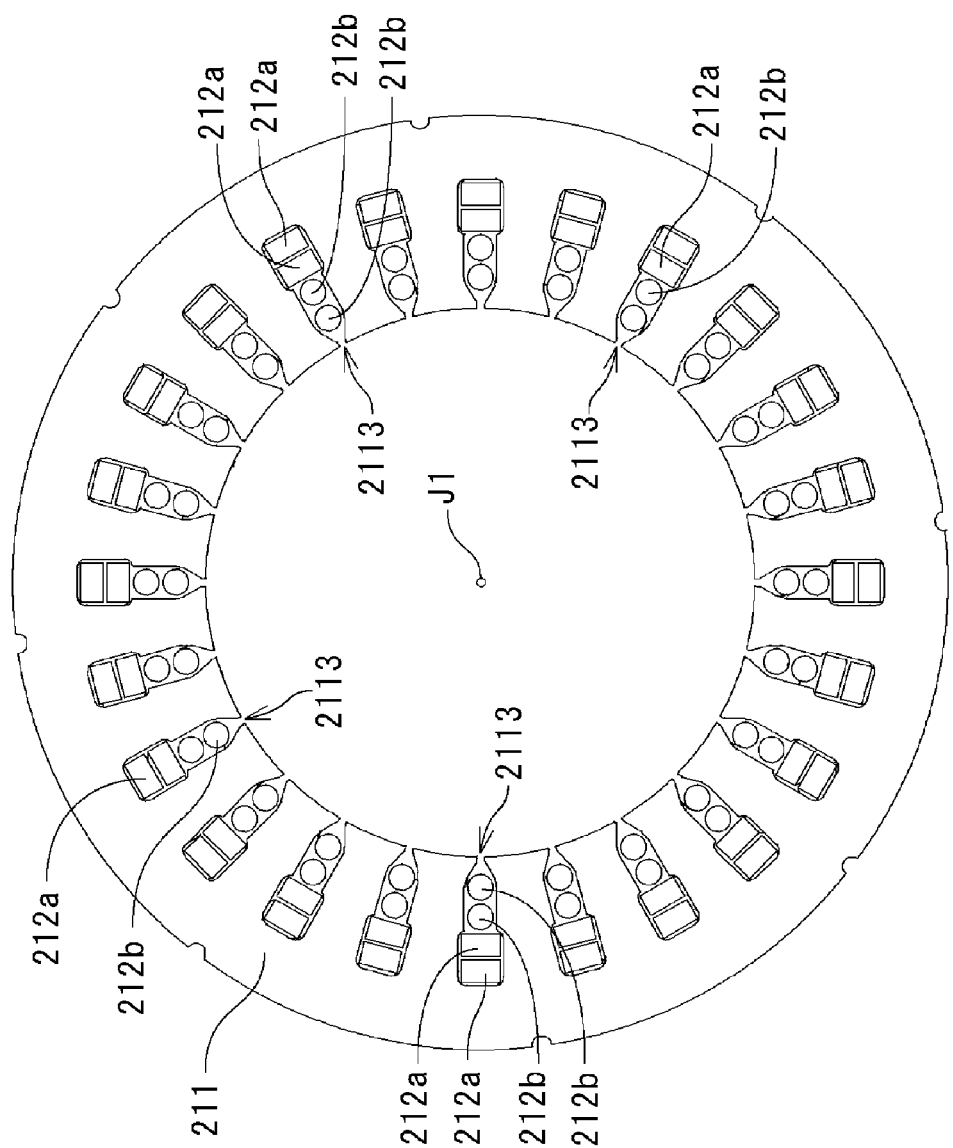
FIG. 6A is a schematic cross sectional view in a perpendicular manner with respect to a central axis of the stator core and the wires according to a first preferred embodiment of the present invention.

FIG. 6A is a schematic cross sectional view of the stator core 211 and the wires 212. Note that for clarity of illustration FIG. 6A omits parallel diagonal lines at the cross section of the stator core 211 and the wires 212. As shown in FIG. 6A, each slot 2113 of the stator core 211 has arranged therein two angular wires 212a and two round wires 212b in the radial direction. Note that the round wires 212b are arranged nearer to the central axis J1 than the angular wires 212a are.

Figure 6B:
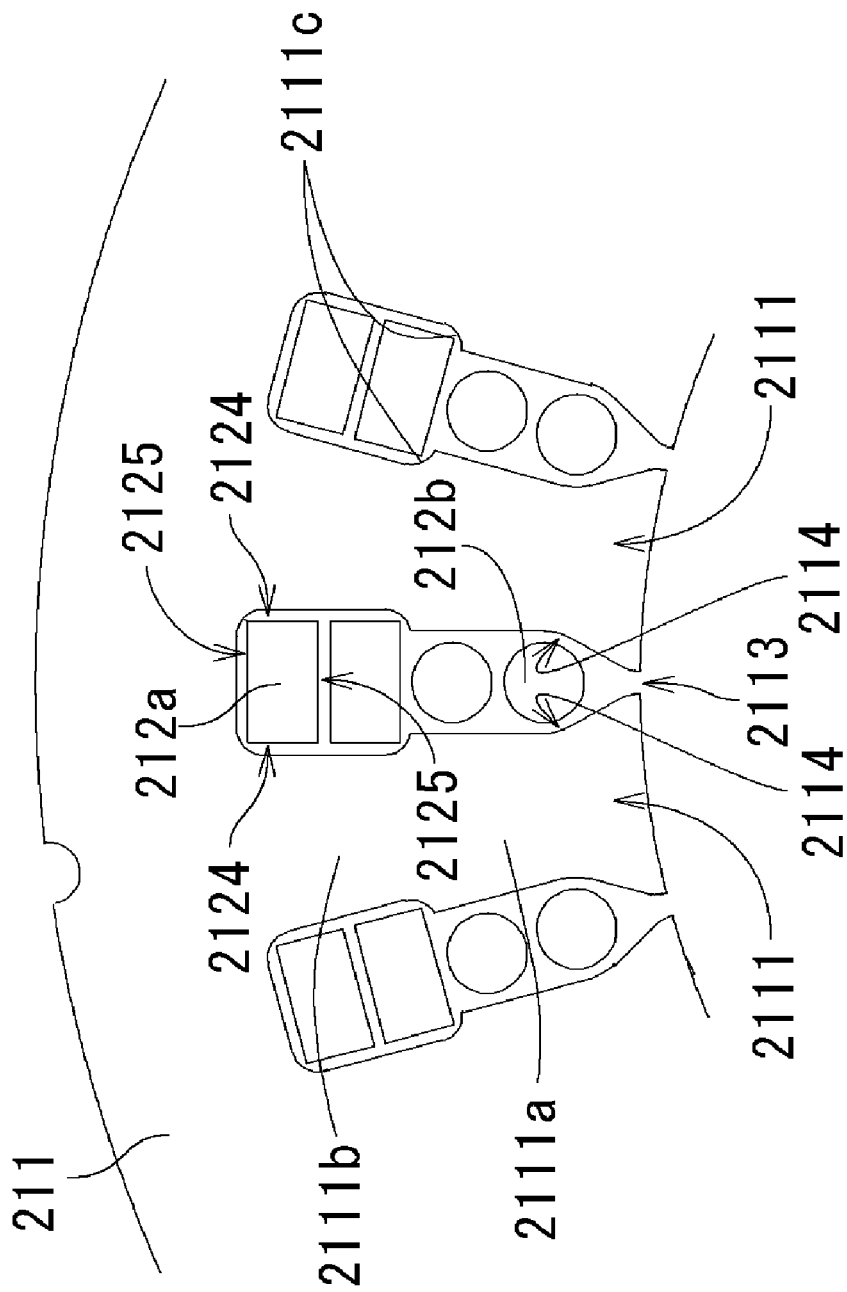
FIG. 6B is an enlarged view of a portion of the stator core and the wires shown in FIG. 6A.

FIG. 6B illustrates an enlarged view of a portion of the stator core 211 and the wires 212 shown in FIG. 6A. As shown in FIG. 6B, a cross section of the angular wire 212a at a portion thereof corresponding to the slot 2113 includes two short sides (2124) arranged in a direction substantially parallel to the radial direction centered about the central axis J1 (see FIG. 6A) and two long sides (2125) arranged substantially perpendicularly to the short sides 2124. Also, note that a portion of each slot nearest to the central axis J1 is curved in accordance with the circular shape of the round wire 212b. Hereinafter, such portion is referred to as a curved portion 2114.

Each tooth 2111 preferably includes an inner side tooth portion 2111a which is arranged at a potion of the tooth 2111 near the central axis J1, and an outer side tooth portion 2111b which is arranged at a portion of the tooth 2111 continuously and radially outside of the inner side tooth portion 2111a.

Note that the round wire 212b is arranged at a portion of the slot 2113 defined by a pair of the inner side tooth portions 2111a facing one another in the circumferential direction, while the angular wire 212a is arranged at a portion of the slot 2113 defined by a pair of the outer side tooth portions 2111b facing one another in the circumferential direction.

By virtue of such configuration, an amount of space for the slot 2113 defined by the inner side tooth portions 2111a facing each other is kept at a minimum and thereby reducing a degree of cogging occurring to the motor. Also by virtue of such configuration, since a magnetic path passing through the teeth 2111 is secured, magnetic saturation occurring at the inner side tooth portion 2111a and the outer side tooth portion 2111b is minimized.

Each tooth 2111 preferably includes at a portion between the inner side tooth portion 2111a and the outer side tooth portion 2111b an outer side curved portion 2111c at which point the slot 2113 is narrowed. By virtue of such configuration, a radial length of the teeth 2111 defining the slots 2113 is kept at a minimum and therefore, the dimension of the stator 21 is minimized.

Also, a circumferential width of the slot 2113 defined by the inner side tooth portions 2111a is smaller than the length of the long side 2125. By virtue of such configuration, a circumferential width of the inner side tooth portion 2111a is effectively enlarged and therefore the magnetic saturation occurring to the inner side tooth portion 2111a is minimized.

As shown in FIG. 2, the stator 21 preferably includes a busbar unit 213 which is arranged axially above the stator core 211 and to which end portion 2123 (see FIG. 4) of the wire 212 is connected. The busbar unit 213 preferably includes a plurality (for example, 6 in the present preferred embodiment) of busbar plates 2131 each having a substantially annular shape centered about the central axis J1 and laminated on top of one another in the axial direction.

The stator 21 preferably includes a plurality of coils 214 each formed by wires 212 wound in a distributed manner around a set of three teeth 2111 next to one another as a unit. That is, two slots 2113 which are next to one another are sandwiched between two slots 2113 through which a single wire 212 including two straight line portions 2121 is arranged. According to the present preferred embodiment of the present invention, each coil 241 preferably includes the angular wire 212a and round wire 212b connected to one another wound twice around the teeth 2111 in an alternate manner. Note that each coil 241 is connected to an external power supply via the busbar unit 213.

The bearing mechanism 4 preferably includes, as shown in FIG. 2, an upper bearing 41 and a lower bearing 42 which are attached respectively at an upper portion and a lower portion of the rotor core 32 to the shaft 31, and a bearing holder 43 which is affixed to the housing 6 and in which the upper bearing 41 is accommodated. The lower bearing 42 is accommodated in an accommodation portion arranged at a bottom central portion of the housing 6 having a substantially cylindrical side wall.

Figure 7:
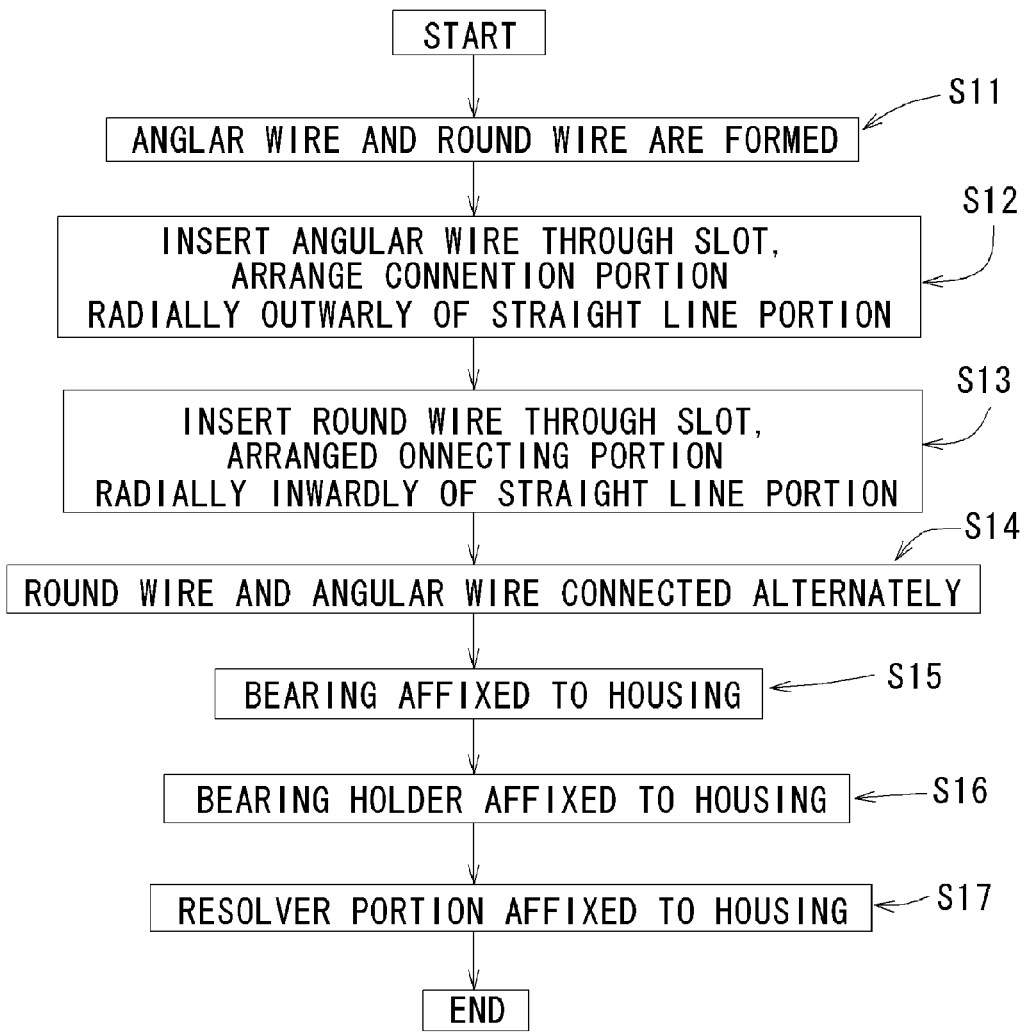
FIG. 7 is a flow chart illustrating a flow of steps of a manufacturing method of the motor according to the first preferred embodiment of the present invention.
Figure 8:
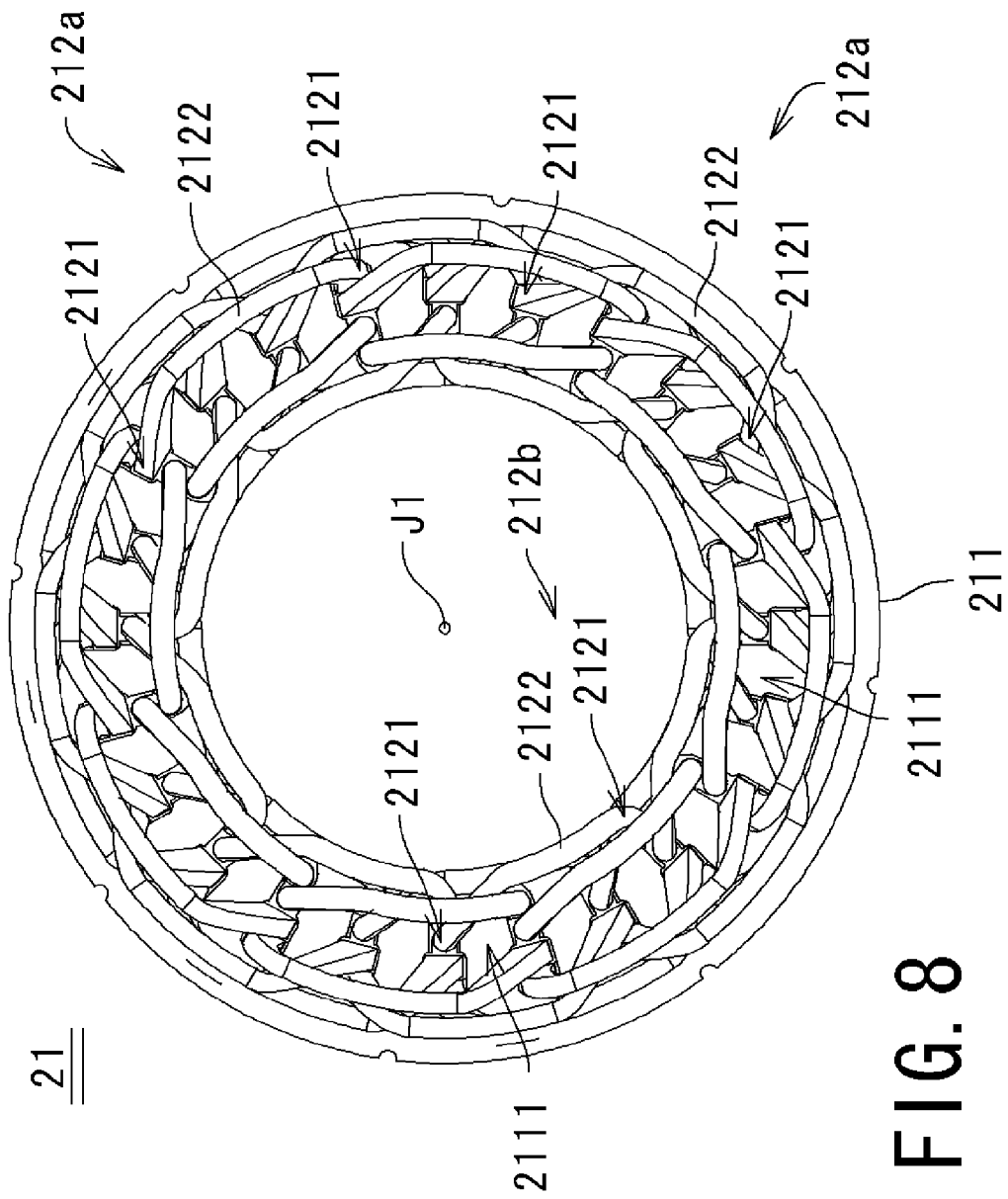
FIG. 8 is a schematic bottom view of the stator according to the first preferred embodiment of the present invention.

Hereinafter, a manufacturing method of the motor 1 will be descried. FIG. 7 show a flow of steps to manufacture the motor 1 according to the present preferred embodiment of the present invention. FIG. 8 is a schematic bottom plan view of the stator 21 according to the present preferred embodiment of the present invention.

First, the plurality of wires each preferably having a substantially rectangular shape in cross section are prepared. Then, the wires are pressed so as to form the substantially U-shaped angular wires 212a. Also, the plurality of wires each preferably having a substantially circular shape in cross section thereof are prepared. Then, the wires are pressed so as to form the substantially U-shaped round wires 212b (step S11).

After the angular wire 212a and the round wire 212b are formed, the insulator formed of an insulating material (e.g., resin, or the like) is inserted in the axial direction and attached to the stator core 211. By this, the side, upper and lower surfaces of the teeth 2111, and the upper and lower surfaces of the core back portion 2112 are coated with an insulating layer.

Then, the straight line portions 2121 of the wires 212 are inserted through the slots 2113 from the lower side of the stator core 211. By this, the end portion 2123 of the wires 212 will protrude above the top surface of the stator core 211 as shown in FIG. 4. Note that the connecting portion 2122 of the each angular wire 212a is, as shown in FIG. 8, arranged radially outwardly of the two straight line portions 2121 (step S12).

Then, two straight line portions 2121 of the round wires 212b are inserted from the lower side of the stator core 211 to each slot 2113 of the stator core 211 such that the end portions 2123 of each round wire 212b projects upwardly from the stator core 211. At this point, the connecting portions 2122 of each round wire 212b is arranged radially inwardly of the straight line portions 2121 (step S13). Note that according to the present preferred manufacturing method of the motor 1, the inserting of the angular wires 212a to the stator core 211 (step S12) and the inserting of the round wire 212b to the stator core 211 (step S13) may be carried out simultaneously; or step S13 may be carried out before step S12 is carried out.

One of the end portions 2123 per wire 212 is connected to the busbar unit 213. By virtue of such configuration, the angular wires 212a and the round wires 212b are connected to one another alternately (step S14).

Then, the upper bearing 41 and the lower bearing 42 which are attached to the rotor portion 3 and the shaft 31 are inserted into an inner side of the stator 21 inside the housing (step S15).

After the rotor portion 3 is inserted into the stator 21, the bearing holder 43 is affixed to the housing 6 at an opening side thereof (step S16). Then, the resolver portion 5 is affixed to the housing 6 above the bearing holder 43 (step S17) to complete the manufacturing of the motor 1.

As described above, the connecting portions 2122 of the wires 212 whose straight line portions 2121 are arranged at a radially outward portion of the slot 2113 are arranged radially outwardly of the straight line portions 2121 of the same wires 212, and the connecting portions 2122 of the wires 212 whose straight line portions 2121 are arranged at a radially inward portion of the slot 2113 are arranged radially inwardly of the straight line portions 2121 of the same wires 212.

By virtue of such configuration, the connecting portion 2122 of one of the plurality of wires 212 is not in the way of the following wire 212 to be inserted into the corresponding slots 2113. Therefore, when the following wires 212 are being attached to the stator core 211, the connecting portions 2122 of the wires 212 are arranged near a bottom surface 2115 of the stator core 211.

By virtue of such configuration, a degree of protrusion of the coils 214 protruding from the stator core 211 is minimized, and therefore, the dimension of the stator 21 and the motor 1 can be minimized. Also, since a length of the connecting portion 2122 is minimized, the degree of electric resistance of the coils 214 is reduced thereby improving the efficiency of the motor 1.

According to the stator 21 of the present preferred embodiment of the present invention, a gap is formed between the connecting portions 2122 arranged radially inwardly and the connecting portions 2122 arranged radially outwardly below the lower side of the stator core 211. By virtue of such configuration, heat which is generated while the motor 1 is in motion is effectively released and thereby effectively controlling the temperature increase of the motor 1.

Also, since each slot 2113 is shaped in accordance with the cross section of the wires 212 which are accommodated therein, the circumferential width of each tooth 2111 is not compromised, and therefore the degree of design freedom of the coils 214 is improved which also maintains a balance between the reduction of the electric resistance of the coils 214 and the magnetic resistance of the teeth 2111.

Also, the configuration in which the degree of protrusion of the coils 214 protruding from the stator 21 is minimized is suitable for a motor in which each slot therein includes a plurality (for example, greater than 4) of wires and therefore the degree of protrusion of the coil tends to be great.

Since the motor which is used in the compressor in the air conditioner or the like in a motor vehicle is expected to have a low voltage and a large output, a size of a cross section of a coil used therein is forced to be great which consequently imposes various restrictions on the design of the coil. The motor 1 according to the present preferred embodiment of the present invention allows the improved design freedom for the coil 214 without compromising on the circumferential width of the teeth 2111. Also, the motor which is used in the compressor in the air conditioner or the like in the motor vehicle is expected to be small in dimension and highly efficient. According to the stator 21 of the present preferred embodiment of the present invention, the small dimension of the motor 1 and high efficiency thereof are realized as described above. Therefore, the motor 1 according to the present preferred embodiment of the present invention is particularly suitable for the compressor in the air conditioner of the like in the motor vehicle. Also, from a view point of improving safety and reduction of heat demagnetization, an IPM (Interior Permanent Magnet) motor in which a permanent magnet is embedded at a rotor core inside a stator is used in the compressor for the air conditioner or the like in a motor vehicle. The present invention is suitable for the IMP motor.

The wires 212 each having a larger cross section are arranged at the radially outward portion of the slots 2113 since the circumferential width of each slot 2113 of the stator core 211 is greater at the radially outward portion than the radially inward portion. According to the stator 21 of the present preferred embodiment of the present invention, the angular wires 212a which are easily acquired are arranged radially outward of the round wires 212b, and therefore, the manufacturing of the motor 1 becomes effective and allows the manufacturing cost to be lowered. Conventionally, the inner rotor type motor having the rotor core inside the stator includes elements such gear, or the like, which are attached to the shaft is arranged near the rotor core. According to the motor of the present preferred embodiment, a large space is created at the radially inner side of the connecting portions 2122 providing an efficient space to operate therein when attaching the elements to the shaft. By virtue of such configuration, while the stator 21 is particularly suitable for the inner rotor type motor, the degree of design freedom of the motor 1 is improved.

Also, since the stator 21 according to the present preferred embodiment of the present invention includes the slots 2113 whose inner side surface are correspondingly shaped to fit the round wires 212b, the circumferential width of the teeth 2111 is not compromised. By virtue of such configuration, the magnetic resistance of the teeth 2111 is reduced. Also, since the slots 2113 are shaped in accordance with the shape of the wires 212, the dimension of the stator core 211 is minimized.

Also, since the angular wire 212a and the round wire 212b whose cross section is smaller than that of the angular wire 212a are alternately connected one another, the distribution of the cross section of the wires 212 becomes even. By virtue of such configuration, heat generated at the round wire 212b having a higher temperature than the heat generated at the angular wire 212a is dissipated toward the angular wire 212a, and the distribution of heat in the coils 214 becomes even.

Also, since the motor 1 according to the present preferred embodiment of the present invention includes the substantially U-shaped wires 212 each having two straight line portions 2121 to form the coils 214, the number of connections between the busbar 2132 and the wires 212 is reduced, compared with the wires formed by straight wires (each having a substantially I-shaped configuration). Also, since the wires 212 are connected to the busbar 2132 while the wires 212 are accommodated in the slots 2113, the connection therebetween is easily carried out. By virtue of such configuration, the manufacturing of the stator 21 and that of the motor 1 become more efficient.

Also, according to the manufacturing method of the stator 21, the angular wire 212a includes two straight line portions 2121 each having a side surface 2126 opposed to one another and connected to one another via an upper surface 2127 of the connecting portion 2122 (i.e., the angular wire 212a is not twisted). By virtue of such configuration, the angular wires 212a are formed by a simple pressing method.

Figure 9:
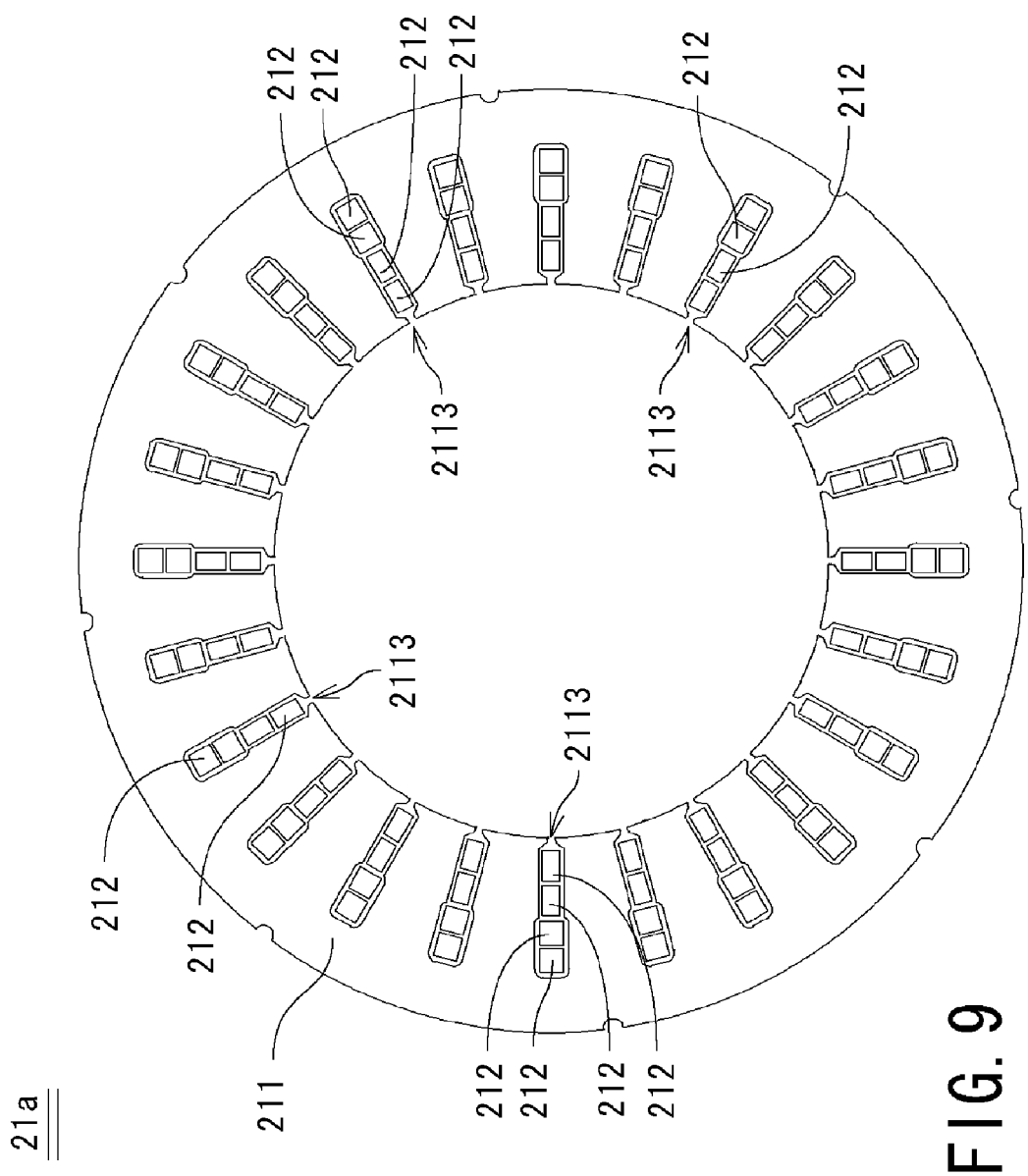
FIG. 9 is a schematic cross sectional view of a portion of a stator of a motor according to a second preferred embodiment of the present invention.

Hereinafter, a motor according to a second preferred embodiment of the present invention will be described. FIG. 9 is a schematic cross sectional view of a stator 21 of the motor according to a second preferred embodiment of the present invention. As shown in FIG. 9, in the stator 21a, a cross section of each of the plurality of wires 212 preferably is substantially rectangular. Note that the configuration of the motor according to the second preferred embodiment is identical with that of the first preferred embodiment as shown in FIGS. 1 through 8. Also, elements and manufacturing method for the second preferred embodiment similar to those illustrated for the first preferred embodiment are denoted by similar reference numerals and description thereof is omitted.

In the stator 21a, the pair of straight line portions 2121 for each wire 212 and the connecting portion 2122 have a substantially rectangular shape at the cross section. The wire 212 includes the pair of straight line portions 2121 connected by the connecting portion 2122 forming the substantially U-shaped configuration.

In the stator 21a, the connecting portion 2122 of the wire 212 which is arranged at a radially outward portion of the slot 2113 of the stator core 211 is, in the same manner as in the first preferred embodiment, arranged radially outwardly of the pair of straight line portions 2121 of such wire 212. Also, the connecting portion 2122 of the wire 212 which is arranged at a radially inward portion of the slot 2113 of the stator core 211 is, in the same manner as in the first preferred embodiment, arranged radially inwardly of the pair of straight line portions 2121 of such wire 212. By virtue of such configuration, the connecting portions 2122 are effectively arranged to allow the dimension of the stator 21a and the motor to be minimized. The configuration of the stator 21a as described above is particularly suitable for a motor whose coils are formed by the angular wire whose connecting portion tends to be larger than that for the round wire.

Figure 10:
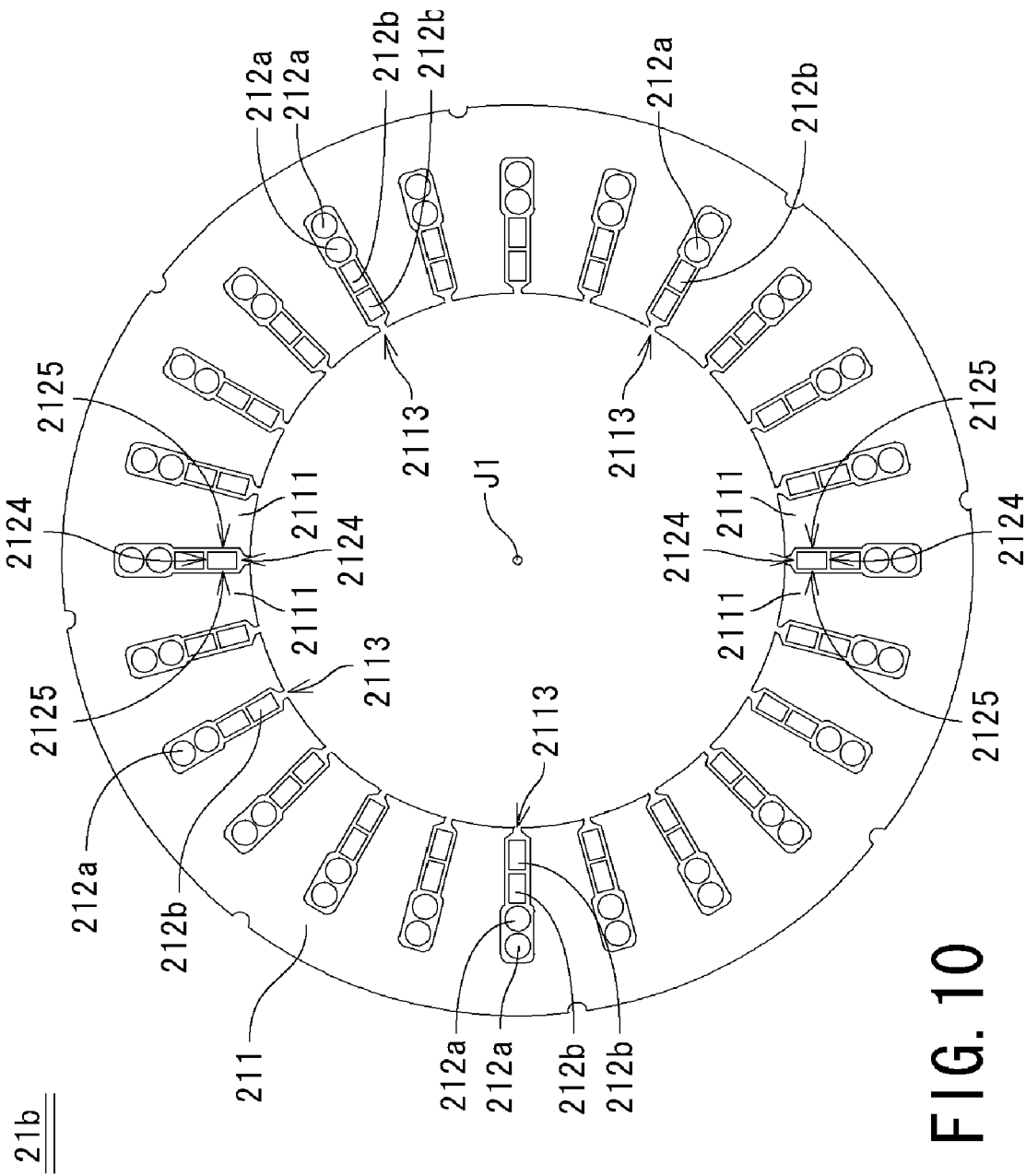
FIG. 10 is a schematic cross sectional view of a portion of a stator of a motor according to a third preferred embodiment of the present invention.

Hereinafter, a motor according to a third preferred embodiment of the present invention will be described. FIG. 10 is a schematic cross sectional view of a portion of a stator 21b of the motor according to the third preferred embodiment of the present invention. Note that in FIG. 10, for clarity of depiction, the stator core 211 of the stator 21b and the plurality of wires 212 are depicted without parallel diagonal lines.

As shown in FIG. 10, in each slot 2113 of the stator core 211 of the stator 21b the pairs of straight line portions 2121 of two of angular wires 212a and the pair of straight line portions 2121 of two of round wires 212b are arranged in the radial direction centered about the central axis J1. Also, as shown in FIG. 10, the angular wires 212a are arranged radially inwardly of the round wires 212b. Note that the configuration of the motor according to the third preferred embodiment is identical with that of the first preferred embodiment as shown in FIGS. 1 through 8. Also, elements and manufacturing method for the third preferred embodiment similar to those illustrated for the first preferred embodiment are denoted by similar reference numerals and description thereof is omitted.

According to the stator 21b, the cross section of the angular wire 212a at a portion thereof corresponding to the slot 2113 preferably includes two long sides 2125 arranged in the direction parallel or substantially parallel to the radial direction centered about the central axis J1 and two short sides 2124 perpendicular or substantially perpendicular to the long sides 2125. Note that in the present preferred embodiment, the cross sectional area of the angular wire 212a is smaller than that of the round wire 212b.

According to the stator 21b, each slot 2113 is shaped in accordance with the cross sectional shape of the wires 212. By virtue of such configuration, the circumferential width of each tooth 211 will not be compromised, and the design freedom of the coils 214 will be improved. Therefore, the balance between the reduction of the electric resistance of the coils 214 and the reduction of the magnetic resistance of the teeth 2111 will be maintained.

Also, since the stator 21b the slot 2113 accommodates at the radially inward portion thereof the angular wires 212a whose cross section is more space efficient than the round wires 212b, a difference between the area of the cross section of the round wire 212b and the cross section of the angular wire 212a is minimized. By virtue of such configuration, evenness of the cross section among the wires 212 is improved and enlarged, and therefore, the motor according to the present preferred embodiment of the present invention will be effective.

While preferred embodiments of the present invention have been described in detail above, it is to be understood that variations and modifications will be apparent to those who skilled in the art without departing from the scope and spirit of the present invention.

For example, although the preferred embodiments described above assume that the cross section of the connecting portion 2122 of the angular wires 212a preferably is substantially rectangular, the present invention is not limited thereto. Note that if the cross section of the straight line portion 2121 of the angular wire 212a is substantially rectangular, the connecting portion 2122 does not need to include the substantially rectangular shape at the cross section thereof. Also, as for the round wires 212b, the cross section of the connecting portion 2122 is not limited to the substantially circular shape if the cross section of the straight line portion 2121 includes the substantially circular shape.

Although the preferred embodiments described above assume that the angular wire 212a and the round wire 212b are connected to one another in the alternate manner, the present invention is not limited thereto. Also, the straight line portions 2121 of two round wires 212b may be arranged radially outwardly of the straight line portions 2121 of two angular wires 212a in each slot 2113.

Although the preferred embodiments described above assume that each slot 2113 accommodates therein four straight line portions 2121 of the wires 212, the present invention is not limited thereto. The slot 2113 may accommodate therein less than or more than four straight line portions 2121. Also, the coils 214 may be formed by wires 212 wound in a manner other than distributed manner (e.g., concentrated manner). Also, the coils 213 may be formed by using the angular wire having shapes other than the substantially U-shaped configuration (e.g., a substantially I-shaped configuration).

Also, the stator 21 may include a wire having a modified shape in which a connecting portion 2122 is arranged radially outwardly of the pair of straight line portions 2121. The connecting portions 2122 may be arranged radially inwardly of the straight line portion 2121 for all the wires having the modified shape. By virtue of such configuration, the connecting portions 2122 may be arranged effectively allowing the stator and the motor having such stator to be small in dimension. Also, such configuration allows the connecting portions 2122 to be short thereby increasing the efficiency of the motor. Also, such configuration allows the heat generated from the connecting portion 2122 while the motor is in motion to be dissipated effectively.

It is be noted that, from a perspective of improving the efficiency of motor, heat dissipation from the side of the connecting portion 2122, and minimizing the dimension of the motor, the connecting portion 2122 of the wire 212 arranged at a radially outward portion of the slot is preferably arranged radially outwardly of the straight line portions 2121 of the wire 212, and the connecting portion 2122 of the wire 212 arranged at a radially inward portion of the slot is preferably arranged radially inwardly of the straight line portions 2121 of the wire 212.

Although the preferred embodiments of the present invention assume that the motor according to the present invention is the inner rotor type motor, the present invention is not limited thereto; the present invention may be an outer rotor motor. Also, the motor according to the present invention may be used as a power source for a hybrid car, an electric motor vehicle or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
   a stator including:
      a stator core including a plurality of teeth each extending in a radial direction centered about a central axis, and arranged in a circumferential direction so as to be spaced evenly apart from one another;
      a plurality of coils disposed in a plurality of slots each defined by a pair of the teeth located next to one another, and being defined by a plurality of wires electrically connected with each other and each including a portion extending in an axial direction; and
      a busbar unit arranged axially above the stator core and connected to each of the plurality of wires; wherein
   the plurality of wires include an angular wire having a substantially rectangular cross section at a portion thereof corresponding to a location of the slot when viewed from one end of the axial direction and a round wire having a substantially circular cross section at a portion thereof corresponding to a location of the slot when viewed from the one end of the axial direction;
   each slot includes the angular wire and the round wire arranged in the radial direction therein, and the round wire is arranged radially inward of the angular wire;
   the angular wire includes a pair of straight line portions each accommodated in the slot and extending in the axial direction, and a curved connecting portion integrally connecting the pair of the straight line portions of the angular wire;
   the round wire includes a pair of straight line portions each accommodated in the slot and extending in the axial direction, and a curved connecting portion integrally connecting the pair of the straight line portions of the round wire;
   the connecting portions of the angular wires are curved in a direction radially away from the straight line portions of the round wires and the connecting portions of the round wires are curved in a direction radially away from the straight line portions of the angular wires; and
   the connecting portions of the angular wires and the connecting portions of the round wires extend in mutually opposite radial directions.

2. The motor according to claim 1 wherein the cross section of the angular wire includes two short sides extending in the substantially radial direction and two long sides extending substantially perpendicularly from the two short sides.

3. The motor according to claim 1, wherein a side of each tooth defining the slot includes a curved portion fitting to the cross section of the round wire.

4. The motor according to claim 3, wherein each tooth includes:
- an inner side tooth portion arranged radially inwardly of the curved portion, and configuring a portion of the slot accommodating the round wire; and
- an outer side tooth portion arranged radially outwardly of the inner side tooth portion, and configuring a portion of the slot accommodating the angular wire; wherein
- the inner side tooth portion includes a portion that is wider than the outer side tooth portion in the circumferential direction.

5. The motor according to claim 4, wherein a circumferential width of the inner side tooth portion and a circumferential width of the outer side tooth portion increase in a radially outward direction.

6. The motor according to claim 4, wherein the side of each tooth includes at a portion thereof connecting the inner side tooth portion and the outer side tooth portion an outer side curved portion at which point the slot is narrowed.

7. The motor according to claim 1 wherein the angular wire and the round wire are connected to one another alternately.

8. The motor according to claim 1, wherein the connecting portion of the angular wire and the connecting portion of the round wire are arranged axially on top of one another.

* * * * *